Figure 1:
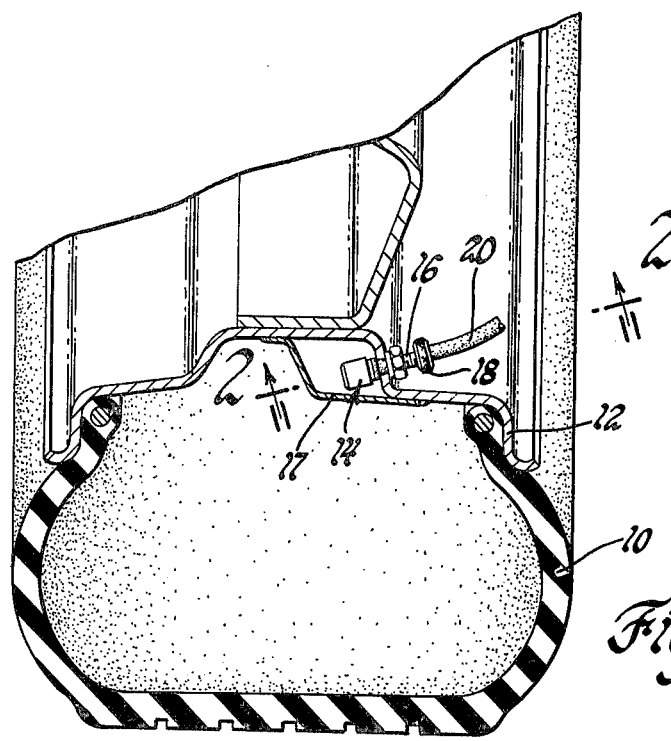

United States Patent [19]

Byram

[11] 4,208,982
[45] Jun. 24, 1980

[54] AIR SWITCH FOR LOW TIRE PRESSURE INDICATION

[75] Inventor: Robert J. Byram, Grand Blanc, Mich.

[73] Assignee: General Motors Corporation, Detroit, Mich.

[21] Appl. No.: 60,468

[22] Filed: Jul. 25, 1979

[51] Int. Cl.$^2$ .......................................... B60C 23/04
[52] U.S. Cl. .................................. 116/34 R; 73/146.2
[58] Field of Search ..................... 116/34 R; 73/146.2, 73/146.3, 146.8; 340/58; 137/227

[56] References Cited

U.S. PATENT DOCUMENTS

| | | | |
|---|---|---|---|
| 1,582,523 | 4/1926 | Larson et al. | 137/227 |
| 2,438,413 | 3/1948 | Renner | 116/34 R |
| 2,510,785 | 6/1950 | Potts et al. | 340/58 X |
| 2,798,449 | 7/1957 | Catlin | 116/34 R |
| 3,230,968 | 1/1966 | Struby | 73/146.8 X |
| 3,537,068 | 10/1970 | Amundsen, Jr. | 340/58 |

*Primary Examiner*—Daniel M. Yasich
*Attorney, Agent, or Firm*—Warren D. Hill

[57] ABSTRACT

An air switch responsive to low tire pressure for emitting a pulse of air when a critical low tire pressure is achieved comprises a housing having a chamber ported to the internal tire pressure and a bellows within the chamber filled to a reference pressure. A passageway connecting the chamber to an outlet port is closed by a spring biased poppet valve. A pin on the moving end of the bellows is arranged to extend through the passageway to abut the poppet valve so that when low tire pressure causes bellows expansion, the pin will unseat the poppet valve to allow air pressure to escape from the tire through the outlet port. A second valve surrounding the stem on the bellows engages the chamber end of the passageway to close the same whenever the tire pressure reaches a second critical low pressure to stop the airflow through the outlet port.

2 Claims, 2 Drawing Figures

AIR SWITCH FOR LOW TIRE PRESSURE INDICATION

This invention relates to a low tire pressure air switch and particularly to such a switch which emits a pneumatic signal when the tire pressure reaches a predetermined low level.

It has previously been proposed, for example, in the U.S. patent to Lorenz et at U.S. Pat. No. 3,977,355 to provide a low tire pressure warning system in which low tire pressure is sensed by an air switch having a bellows charged to a predetermined pressure and effective to open a valve to emit a flow of air from the valve to a signal actuator. The actuator, which is mounted on the tire for rotation therewith, emits a signal when actuated that is picked up by a stationary transducer on the vehicle and an electronic circuit provides a signal indicating that a low tire pressure event has occured. The airflow from the tire through the air switch to the actuator continues until the capacity of the actuator is satisfied and a vent in the actuator device is closed.

It is a general object of this invention to limit the airflow from an air switch to an actuator after a low pressure event independently of the actuator.

It is a further object of this invention to provide in such a bellows operated air switch a valve arrangement to allow emission of air at a first predetermined tire pressure and to stop the flow of air at a second lower predetermined tire pressure.

The invention is carried out by providing a housing having a chamber for communicating with tire pressure and an outlet port connected by a passageway to the chamber, a bellows precharged to a reference pressure situated in the chamber and having a pin on its movable end extending into the passageway, a valve spring biased to normally close the passageway and aligned with the pin so that as tire pressure falls, the bellows expansion causes the pin to unseat the valve to allow emission of air pressure to the outlet port, and a second valve surrounding the pin seats against the pasageway when the tire pressure falls to a second lower pressure to halt the airflow through the passageway.

Figure 2:
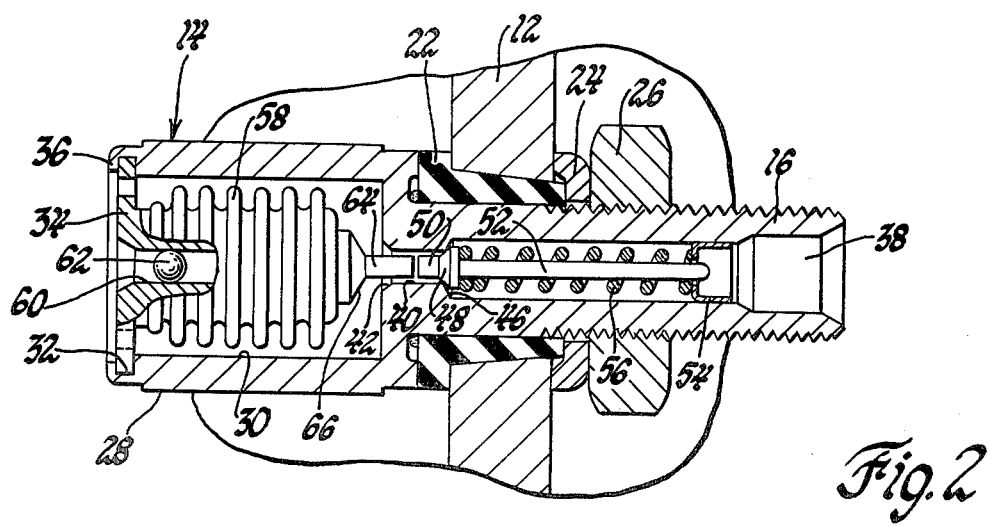

The above and other advantages will be made more apparent from the following specification taken in conjunction with the accompanying drawings wherein like reference numerals refer to like parts and wherein:

FIG. 1 is a cross-sectional view of a tire containing an air switch according to the invention, and FIG. 2 is a cross-sectional view of an air switch according to the invention.

Referring to FIG. 1 a tire 10 mounted on a rim 12 which carries an air switch 14 having a stem portion 16 extending through a port in the rim 12. A guard 17 is secured inside the rim 12 to protect the air switch 14 from damage during mounting of tire 10 on the rim 12. The stem 16 of the air switch is connected by an adapter 18 to a flexible hose 20 which leads to a low tire pressure signal actuator, not shown which may be of the type shown in the aforesaid U.S. Pat. No. 3,977,355. In FIG. 2 the stem 16 of the air switch 14 is shown extending through the apertured rim 12 and a resilient annular seal 22 surrounding the stem provides a secure air seal in the aperture. A washer 24 and a nut 26 on the stem 16 complete the assembly.

The air switch 14 comprises a housing having an enlarged portion 28 for disposition inside the tire and defines an inner chamber 30. An annular groove 32 in the end of the housing 28 receives an apertured bellows assembly end plate 34. A crimped portion 36 at the end of the housing secures the end plate to the housing. The apertured end plate 34 allows the free flow of tire air to the inner chamber 30. The stem 16 of the air switch is hollow to provide an outlet port 38. A passage 40 coaxial with the bellows assembly and the outlet port connects the outlet port 38 to the chamber 30. A pair of chamfered valve seats 42 and 46 are formed at the chamber end and the outlet end of the passage 40, respectively. A poppet valve 48 aligned with the axis of passage 40 comprises a frusto-conical head normally biased against the valve seat 46 and terminates in a guide pin 50 extending into the passageway 40. The pin 50 is of much smaller diameter than the passageway to allow airflow past it when the valve is open. The valve further includes a rearwardly extending stem 52 lying within the outlet port and slidingly supported by a guide 54 which is press fit into the outlet 38. A coil spring 56 surrounding the stem 52 and seated against the guide 54 biases the head of the poppet valve 48 toward the valve seat 46 to normally prevent airflow through the passageway.

A bellows 58 secured to the end plate 34 and mounted within the chamber 30 is precharged internally to a reference pressure which determines the tire pressure at which the air switch will emit a signal. Prior to assembly to the air switch, the bellows is precharged through a port 60 in the end plate of the bellows and the port is then sealed by a ball seal 62. The free end of the bellows 58 is axilly movable to and from the passageway 40 and is aligned therewith. A guide pin 64 extending from the free end of the bellows is slidably movable within the passageway and is so dimensioned to abut the pin 50 on the poppet valve 48 when the tire pressure reaches that preset point at which the valve 48 is about to open. An annular valve head 66 surrounding the pin 64 and normally spaced from the valve seat 42 is movable against the seat 42 upon bellows expansion to close the passage 40. The minimum distance between the valve heads 48 and 66 as determined by the length of the pins 50 and 64 is greater than the length of the passage 40 so that the passage 40 cannot be simultaneously closed at both ends but rather some bellows travel must occur between the point of opening the valve 46 and closing the valve 66.

In operation, assume that a low tire pressure warning signal is desired when the tire pressure decreases to 20 psi. At tire pressures greater than that value, the bellows is in a contracted position and the pin 64 is spaced from the pin 50 thereby allowing the poppet valve 46 to be firmly seated by the biasing action of the spring 56. The bellows 58 is precharged to such a reference pressure that at the attainment of 20 psi of internal tire pressure, the bellows will expand sufficiently to cause the pin 64 to contact the pin 50 and to overcome the bias force of the spring 56 thereby opening the vlave 46. Thus, tire air passing through the chamber 30 and the passage 40 is emitted through the port 38. When a lower pressure level, say 18 psi, is attained the bellows expands enough to force the valve head 66 against the seat 42 thereby closing the passage 40 to stop any further airflow through the outlet port.

It will thus be seen that the tire pressure activated air switch according to this invention provides a self-contained unit for emitting air at a predetermined pressure in sufficient quantity to actuate a suitable signal actuator and for limiting the tire pressure at which air may be emitted through the air switch thereby conserving tire air and at the same time relieving the actuator and any interconnecting plumbing of the responsibility to so limit the emission of tire air.

The embodiments of the invention in which an exclusive property or privilege is claimed are defined as follows:

1. A low pressure air switch for a low pressure warning device for a pneumatic tire normally inflated to a preset pressure, comprising
    a housing defining a chamber and an outlet port, the housing having an opening for connecting the chamber with the internal pneumatic tire pressure,
    a bellows within the chamber having one end fixed relative to the chamber and the other end movable within the chamber, the bellows being charged to a preset pressure corresponding to a low tire pressure limit,
    a valve passage interconnecting the chamber and the outlet port, first and second valve seats surrounding the passage terminus at the outlet port and the chamber respectively,
    a poppet valve having a head normally spring biased against the first valve seat for closing the valve passage when the tire pressure is above the low tire pressure limit, the poppet valve including stem means for guiding the head into registration with the first valve seat,
    a pin on the movable end of the bellows and slidably positioned in the valve passage for selective engagement with the poppet valve so that when tire pressure falls below the low tire pressure limit the bellows expansion causes the pin to push the poppet valve head from its seat against the spring bias to allow tire air to flow through the chamber and the valve passage to the outlet port, and
    an annular valve head mounted on the movable end of the bellows around the pin and normally spaced from and aligned with the second valve seat when the tire pressure is at least at a second limit below the said low tire pressure limit, the annular valve head being movable by the bellows against the second valve seat at tire pressure below the second limit to close the valve passage to further airflow to the outlet port,
    whereby airflow through the passage to the outlet port occurs only when the tire pressure is in a range between the low tire pressure limit and the second limit.

2. A low pressure air switch for a low pressure warning device for a pneumatic tire normally inflated to a preset pressure, comprising
    a housing defining a chamber and an outlet port, the housing having an opening for connecting the chamber with the internal pneumatic tire pressure,
    a bellows having a longitudinal axis disposed within the chamber having one end fixed relative to the chamber and the other end axially movable within the chamber, the bellows being charged to a preset pressure corresponding to a low tire pressure limit,
    a valve passage aligned with the said axis interconnecting the chamber and the outlet port, first and second valve seats surrounding the passage terminus at the outlet port and the chamber respectively,
    a popper valve coaxial with the bellows and having a head normally spring biased against the first valve seat for closing the valve passage when the tire pressure is above the low tire pressure limit, the poppet valve including stem means for guiding the head into registration with the first valve seat,
    an axial pin on the movable end of the bellows and slidably positioned in the valve passage for selective engagement with the poppet valve so that when tire pressure falls below the low tire pressure limit the bellows expansion causes the pin to push the poppet valve head from its seat against the spring bias to allow tire air to flow through the chamber and the valve pasage to the outlet port, and
    an annular valve head mounted on the movable end of the bellows around the pin and normally spaced from and aligned with the second valve seat when the tire pressure is at least at a second limit below the said low tire pressure limit, the annular valve head being movable by the bellows against the second valve seat at tire pressure below the second limit to close the valve passage to further airflow to the outlet port,
    whereby airflow through the passage to the outlet port occurs only when the tire pressure is in a range between the low tire pressure limit and the second limit.

* * * * *